(12) United States Patent
Jackson et al.

(10) Patent No.: US 7,153,025 B1
(45) Date of Patent: Dec. 26, 2006

(54) CARRYING CASE FOR A CONTAINER

(75) Inventors: David L. Jackson, Mechanicsville, VA (US); Jennifer A. O'Flynn, Richmond, VA (US); Kimberly J. Zachary, Richmond, VA (US)

(73) Assignee: Hamilton Beach/Proctor-Silex, Inc., Glen Allen, VA (US)

( * ) Notice: Subject to any disclaimer, the term of this patent is extended or adjusted under 35 U.S.C. 154(b) by 0 days.

(21) Appl. No.: 10/321,346

(22) Filed: Dec. 17, 2002

Related U.S. Application Data

(63) Continuation of application No. 09/570,619, filed on May 15, 2000, now abandoned.

(51) Int. Cl.
*B65D 30/00* (2006.01)
*B65D 30/22* (2006.01)
*B65D 81/38* (2006.01)
*B65D 25/10* (2006.01)

(52) U.S. Cl. .................... 383/2; 383/40; 383/110; 224/246

(58) Field of Classification Search ............ 383/2, 383/110, 117, 303, 38–40; 190/102–103; 206/542, 545, 549; 220/915.1, 915.2, 739–740, 220/592.24, 592.23, 592.22; 224/246, 148.3
See application file for complete search history.

(56) References Cited

U.S. PATENT DOCUMENTS

| | | |
|---|---|---|
| 1,700,615 A | 1/1929 | O'Brien |
| 1,753,813 A | 4/1930 | Washburn |
| 1,768,989 A | 7/1930 | Laacke |
| 1,895,277 A | 1/1933 | Crawford |
| 1,895,278 A | 1/1933 | Crawford |
| 1,922,485 A | 8/1933 | McKee |
| 2,575,893 A | 11/1951 | Seaman |
| 2,610,757 A | 9/1952 | Irvine |
| 2,825,208 A * | 3/1958 | Anderson ............ 190/109 |
| 2,954,891 A | 10/1960 | Imber |
| 2,960,136 A * | 11/1960 | Ziff .................. 383/34 |
| 3,262,283 A | 7/1966 | Taylor |
| 3,428,103 A | 2/1969 | Walsh |
| 3,507,312 A | 4/1970 | Petersen |
| 3,906,129 A | 9/1975 | Damois |
| 3,990,495 A | 11/1976 | LaBarba |
| D262,177 S | 12/1981 | Swan |
| 4,334,601 A | 6/1982 | Davis |
| 4,489,770 A * | 12/1984 | Reich, II ............. 206/320 |
| 4,509,645 A | 4/1985 | Hotta |
| 4,661,989 A | 4/1987 | Risby |
| 4,679,242 A | 7/1987 | Brockhaus |
| D302,636 S | 8/1989 | Singer |

(Continued)

OTHER PUBLICATIONS

Front and rear covers and p. 32 of "Community Kitchens The Art of Food" published 1993 by Community Coffee Co.

(Continued)

*Primary Examiner*—Jes F. Pascua
(74) *Attorney, Agent, or Firm*—Roger S. Dybvig

(57) ABSTRACT

A carrying case for heated food containers, particularly slow cookers, has a flexible bottom wall, side wall and lid so that it can be adjusted to accommodate food containers of various different dimensions. A clamp assembly is provided for securely holding a lid on the food container within the carrying case to thereby minimize the likelihood of accidentally spilling its contents. Means are provided for carrying other items on the lid of the carrying case. The case has a belt which can be tightened to adjust the case to different sizes of containers and straps forming a handle.

21 Claims, 5 Drawing Sheets

U.S. PATENT DOCUMENTS

| | | | |
|---|---|---|---|
| 4,892,226 A | | 1/1990 | Abtahi |
| D307,811 S | | 5/1990 | Branco |
| 4,921,151 A | * | 5/1990 | Duvall .................. 224/438 |
| 4,941,603 A | | 7/1990 | Creamer et al. |
| 4,984,906 A | | 1/1991 | Little |
| D321,306 S | | 11/1991 | Behar |
| 5,172,838 A | | 12/1992 | Rowell et al. |
| 5,181,555 A | | 1/1993 | Chruniak |
| 5,251,460 A | | 10/1993 | DeMarco et al. |
| 5,297,870 A | | 3/1994 | Weldon |
| 5,400,610 A | | 3/1995 | Macedo |
| 5,472,279 A | | 12/1995 | Lin |
| 5,490,396 A | * | 2/1996 | Morris ................... 62/457.2 |
| D373,055 S | | 8/1996 | Segura |
| 5,678,666 A | * | 10/1997 | Shyr et al. ................ 190/102 |
| D396,749 S | | 8/1998 | Ortiz |
| 5,800,061 A | | 9/1998 | Volles |
| 5,842,596 A | | 12/1998 | Renfroe |
| D405,254 S | | 2/1999 | Hopper |
| D406,013 S | | 2/1999 | Yousko et al. |
| 5,904,230 A | * | 5/1999 | Peterson .................. 190/107 |
| 5,934,100 A | * | 8/1999 | Hornick .................. 62/457.4 |
| 5,988,879 A | | 11/1999 | Bredderman et al. |
| 6,068,402 A | | 5/2000 | Freese et al. |
| 6,076,641 A | * | 6/2000 | Kinzer et al. ............ 190/18 A |
| 6,092,661 A | | 7/2000 | Mogil |
| 6,238,091 B1 | | 5/2001 | Mogil |
| 6,409,066 B1 | * | 6/2002 | Schneider et al. .......... 224/585 |

OTHER PUBLICATIONS

Drawings and specification of copending U.S. Appl. No. 29/105,972, filed May 17, 1999.

Front and rear covers and pp. 243 and 555 of 96/97 Jewelry, Gift and Home Catalog published by Service Merchandise.

Front and rear covers and p. 375 of Best General Merchandise Catalog 1990/91.

Page 51 of "Homeworld Business" published Mar. 1999 by Homeworld Business.

* cited by examiner

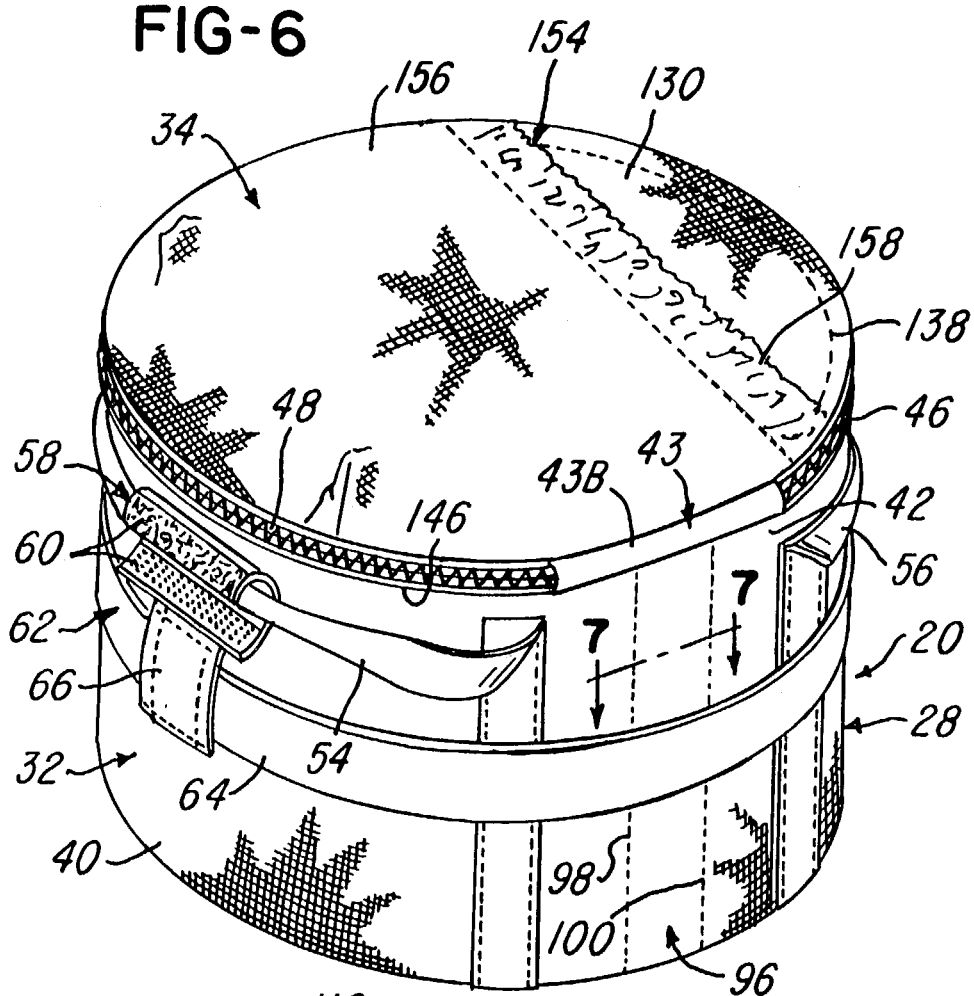
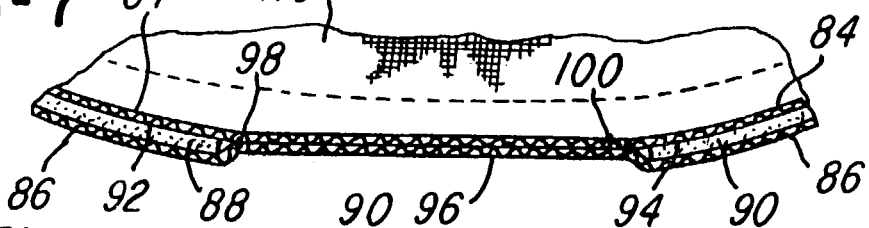
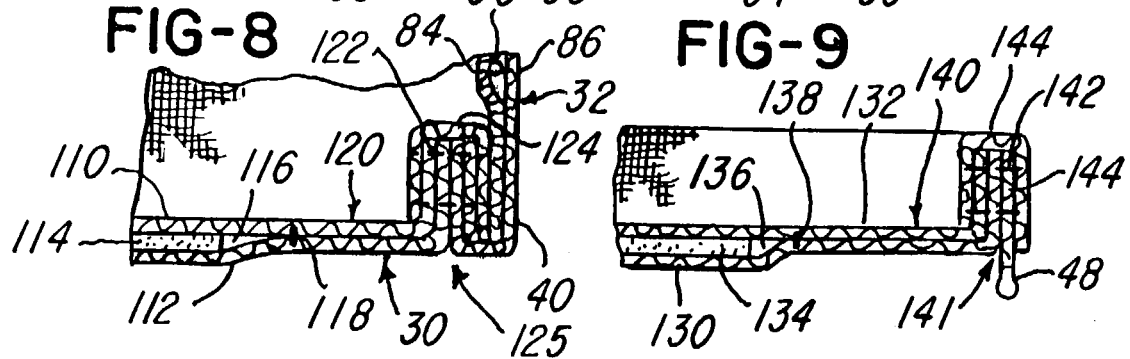

CARRYING CASE FOR A CONTAINER

CROSS-REFERENCE TO RELATED APPLICATION

This application is a continuation of application Ser. No. 09/570,619, filed in the United States Patent and Trademark Office on May 15, 2000, now abandoned.

FIELD OF THE INVENTION

This invention relates to a carrying case for a container primarily intended for use in carrying food-containers, particularly slow cookers.

BACKGROUND OF THE INVENTION

Various carrying cases for slow cookers, casserole dishes and other heated food containers have been suggested and used. However, the known cases typically are designed for carrying only slow cookers or other food containers within a comparatively small range of sizes. In addition, the known cases are capable of carrying a container and have no other utility. Slow cookers and other heated food containers are often used to cook foods which have substantial quantities of liquids. Extreme caution must be used when carrying such food containers to avoid the losses and messes caused by spilling the contents of the containers.

SUMMARY OF THE INVENTION

An object of the present invention is to provide a carrying case for heated food containers, particularly slow cookers, which can be used for carrying food containers of various different sizes within a relatively large range of sizes.

A related object of this invention is to provide a carrying case for heated food containers, particularly slow cookers, which is adjustable to accommodate food containers of various different dimensions.

A more particular object of this invention is to provide an adjustable carrying case for heated food containers which has an attractive appearance regardless of the dimensions of the food container within a range of sizes intended to be carried by the carrying case.

Another object of this invention is to provide a carrying case for heated food containers which can conveniently be used for additionally carrying other items, particularly supplies for use in preparing or presenting the heated food for eating.

Still another object of this invention is to provide a carrying case for a heated food container provided with a clamp for securely holding a lid on the food container to thereby minimize the likelihood of accidentally spilling the contents of the food container.

In accordance with this invention, a carrying case for a heated food container is provided which comprises a housing or box having a flexible bottom wall, side wall and lid, each formed from a pair of flexible sheet materials. Insulating layers, which can be in the form of liners or sheets, are located in the bottom and side walls and in the lid for keeping the food container warm and for insulating the outside of the carrying case from the heated food container. The insulating layers, which are not as flexible as the flexible sheet materials, are confined by stitching within restricted chambers in the bottom wall, the side wall and the lid. The remaining areas have only flexible sheets. A cinch belt surrounds the box and can be tightened to better confine a food container therein. The areas of the box having only flexible sheets readily flex and collapse when the belt is tightened so that the insulating layers do not have to be folded or collapsed.

In other aspects of this invention, the box is provided with carrying straps. The carrying straps and a pair of bottom straps are provided to help retain the shape of the box. A clamp assembly made from flexible clamp members is located inside the box for clamping a heated food container within the box. The lid is provided with elastic bands for carrying utensils useful with a heated food container. A pouch may be formed on top of the box lid. All parts of the box are assembled by stitching so that specialized equipment need not be required for manufacturing the carrying case.

Other objects and advantages will become apparent in view of the following description and the accompanying drawings.

BRIEF DESCRIPTION OF THE DRAWINGS

FIG. 6 is a perspective view of the carrying case of FIG. 1 as viewed generally from above and the rear.

FIG. 7 is a cross-sectional view of the side wall of the carrying case taken on line 7—7 of FIG. 6. In FIG. 7 and also in succeeding FIGS. 8 and 9, the thicknesses of inner and outer sheets illustrated are greatly exaggerated.

FIG. 8 is a cross-sectional view of adjoining portions of the side wall and the bottom wall of the carrying case taken on line 8—8 of FIG. 5.

FIG. 9 is a cross-sectional view of a marginal portion of the lid of the carrying case as viewed along line 9—9 of FIG. 3.

DETAILED DESCRIPTION

Figure 1:
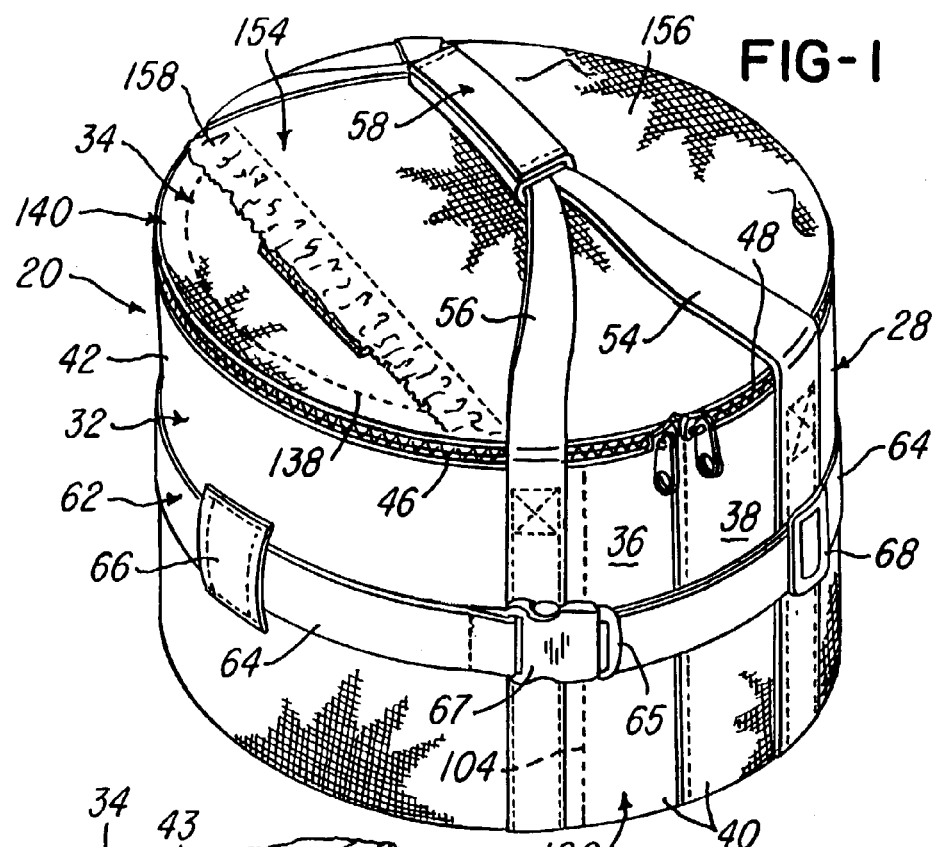
FIG. 1 is a perspective view of a first embodiment of a carrying case for a heated food container in accordance with this invention, with the container shown closed, as viewed generally from the front and above the carrying case.

With reference to FIGS. 1 through 6, this invention is shown embodied in a carrying case 20 for a slow cooker 22 (FIG. 3) having a base 24 and a lid 26. The slow cooker preferably, but not necessarily, is of a type having a lid clamp (not shown) to avoid spillage.

The carrying case 20 comprises a generally cylindrical housing or box 28 having a flexible bottom wall 30, a flexible side wall 32 and a flexible lid 34. In the embodiment shown in FIG. 1, the bottom wall 30 and the lid 34 are circular and in use are generally parallel to one another and coextensive in horizontal planes. Side wall 32 has a first end portion 36 and a second end portion 38 that overlaps the first end portion 36 at the front center of the box 28. A lower margin 40 of the side wall 32 is connected to the outer periphery of the bottom wall 30 and an upper margin 42 is connected to the lid 34 along the rear of the housing 28 by a hinging section 43 which comprises inner and outer strips of flexible sheet material 43A and 43B, respectively, which are connected to both the side wall 32 and the lid 34. In addition, the side wall 32 and the lid 34 are releasably joined together by first slide fastener or zipper 46 and a second slide fastener or zipper 48, the ends of which are covered by the hinge strips 43A and 43B. The first slide fastener 46 extends from the left side of the hinging section 43 (as viewed in FIGS. 1 and 2) to the first side wall end portion 36, and the second slide fastener 48 extends from the right side of the hinging section 43 to the second side wall end portion 38.

Cooperating hook and weave strips 50 and 52, such as those sold under the trademark VELCRO, extend vertically along the inside surface of the second side wall end portion 38 and the outside surface of the first side wall end portion 36. Utilizing the slide fasteners 44 and 46 and the cooperating hook and weave strips 50 and 52, the box 28 can be completely closed to encase a heated food container, such as the slow cooker 22.

A pair of carrying straps 54 and 56 made from woven nylon or other suitable material extend from the front to the rear of the box 28. The ends of the carrying straps 54 and 56 are connected in mutually parallel relationship along the entire height of both the front and the back of the sidewall 32. A flexible handle cinch or wrap 58 provided with hook and weave fastening members 60 (FIG. 6) is attached to the center of the carrying strap 56 and can be wrapped around the carrying strap 54, as shown in FIG. 1, to releasably secure the two carrying straps 54 and 56 together on top of the box 28.

A cinch or adjustment belt 62 encircles the side wall 32 and extends around the portions of the carrying straps 54 and 56 connected to the side wall 32. The belt 62 includes a strap 64 made from a woven nylon fabric or the like which passes through loops 66 sewn to the outside of the side wall 32, mutually-cooperating clasp members 65 and 67, and an adjusting member 68.

Figure 4:
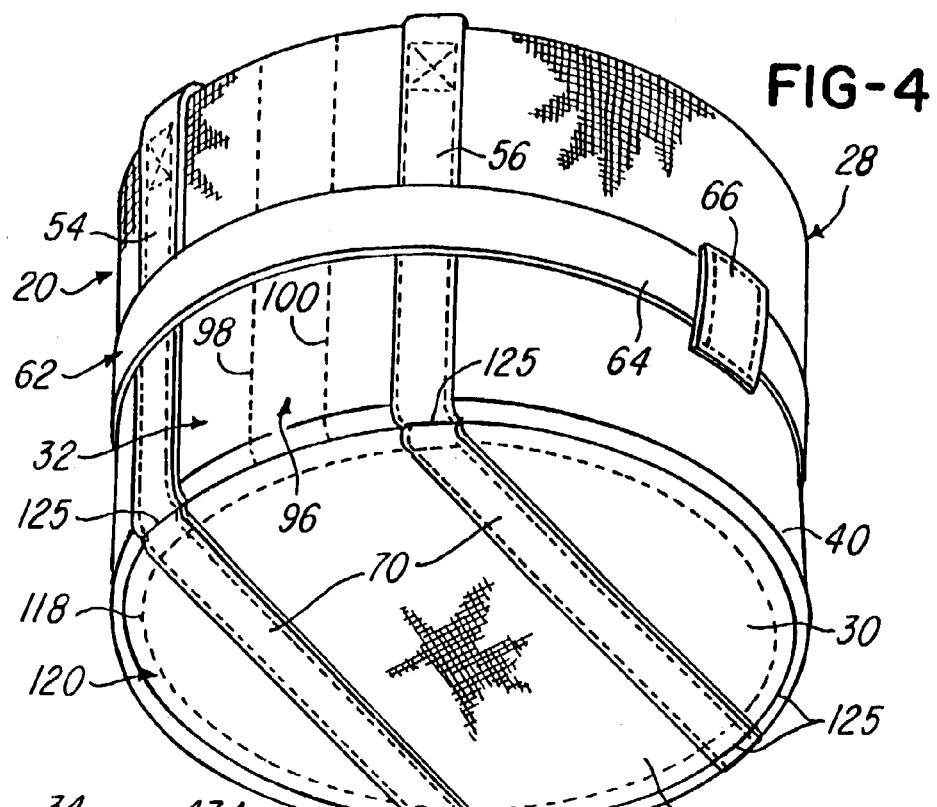
FIG. 4 is a perspective view of the carrying case of FIG. 1 as viewed generally from the below and the rear.
Figure 5:
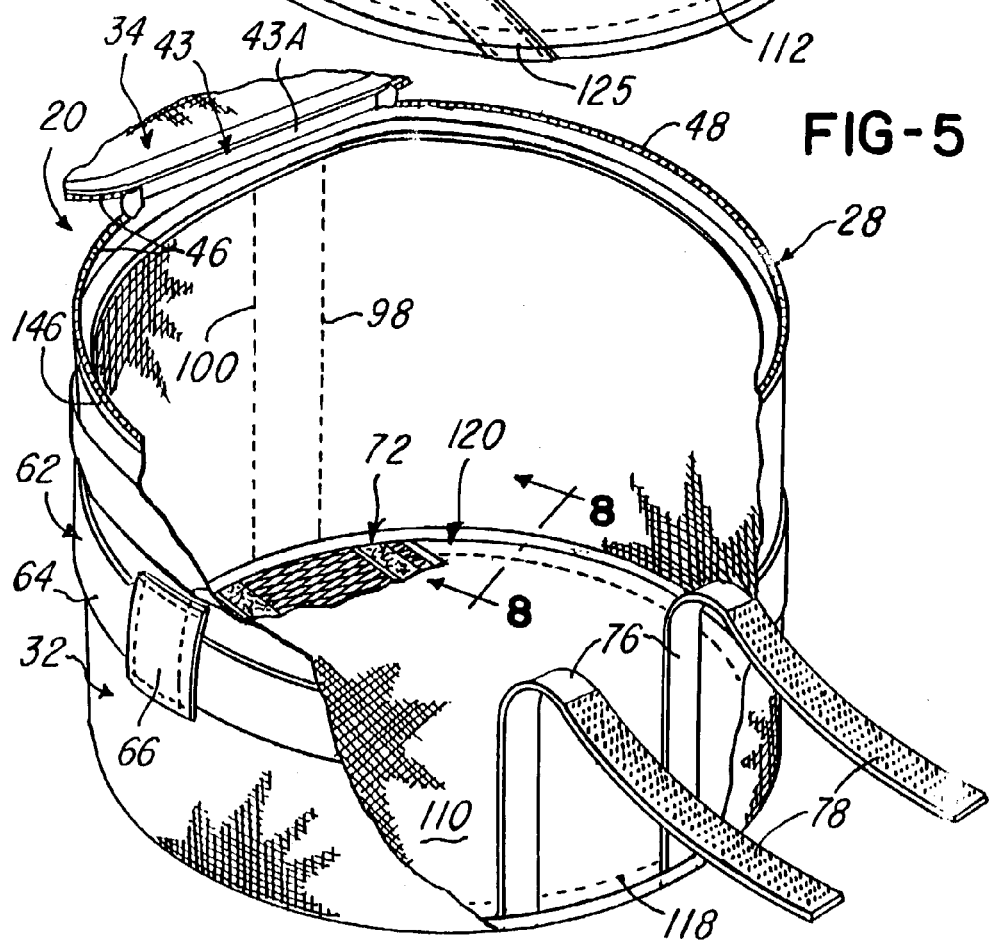
FIG. 5 is a fragmentary perspective view similar to FIG. 3 but illustrating other interior features.

As shown in FIG. 4, a mutually parallel pair of bottom straps 70 made from woven nylon or other suitable material extend from front to rear along the outside of the bottom wall 30. The ends of the bottom straps 70 are preferably aligned with and abut the lower ends of the carrying straps 54 and 56 to provide strength and a measure of rigidity to the box 28.

Figure 2:
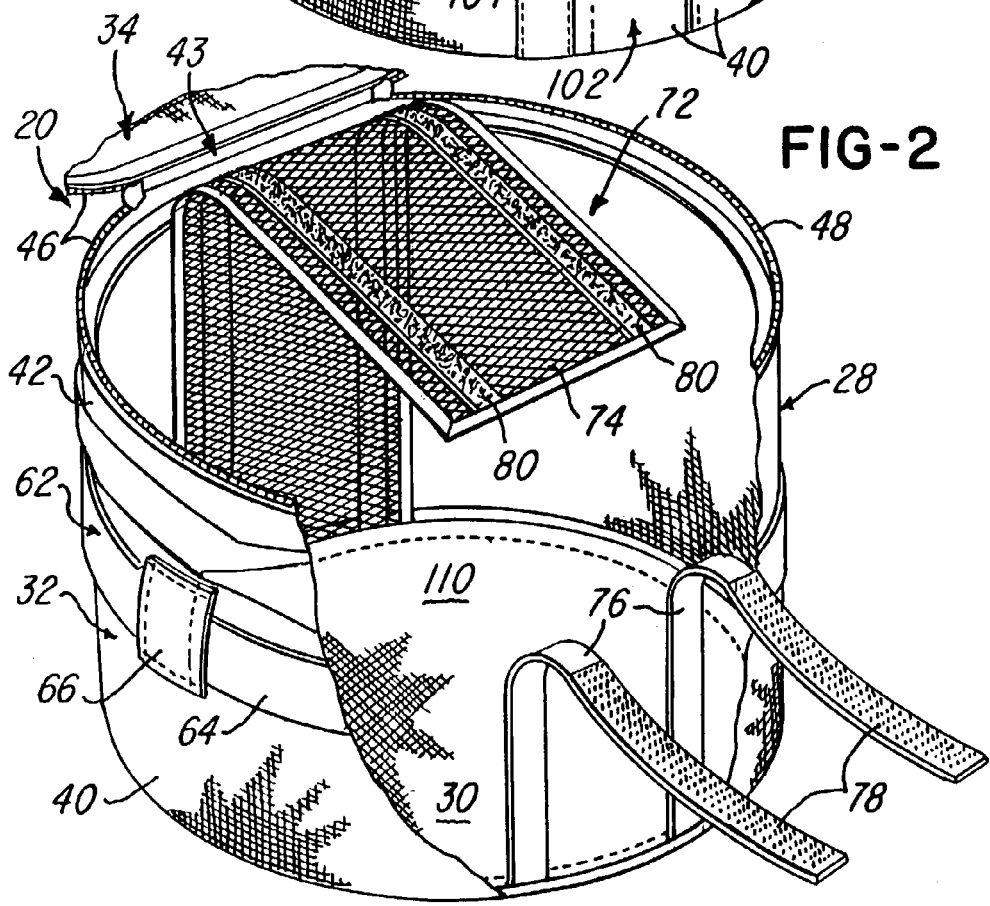
FIG. 2 is a fragmentary perspective view of the carrying case of FIG. 1 shown open to reveal interior features of the carrying case, as viewed generally from the same position as FIG. 1.
Figure 3:
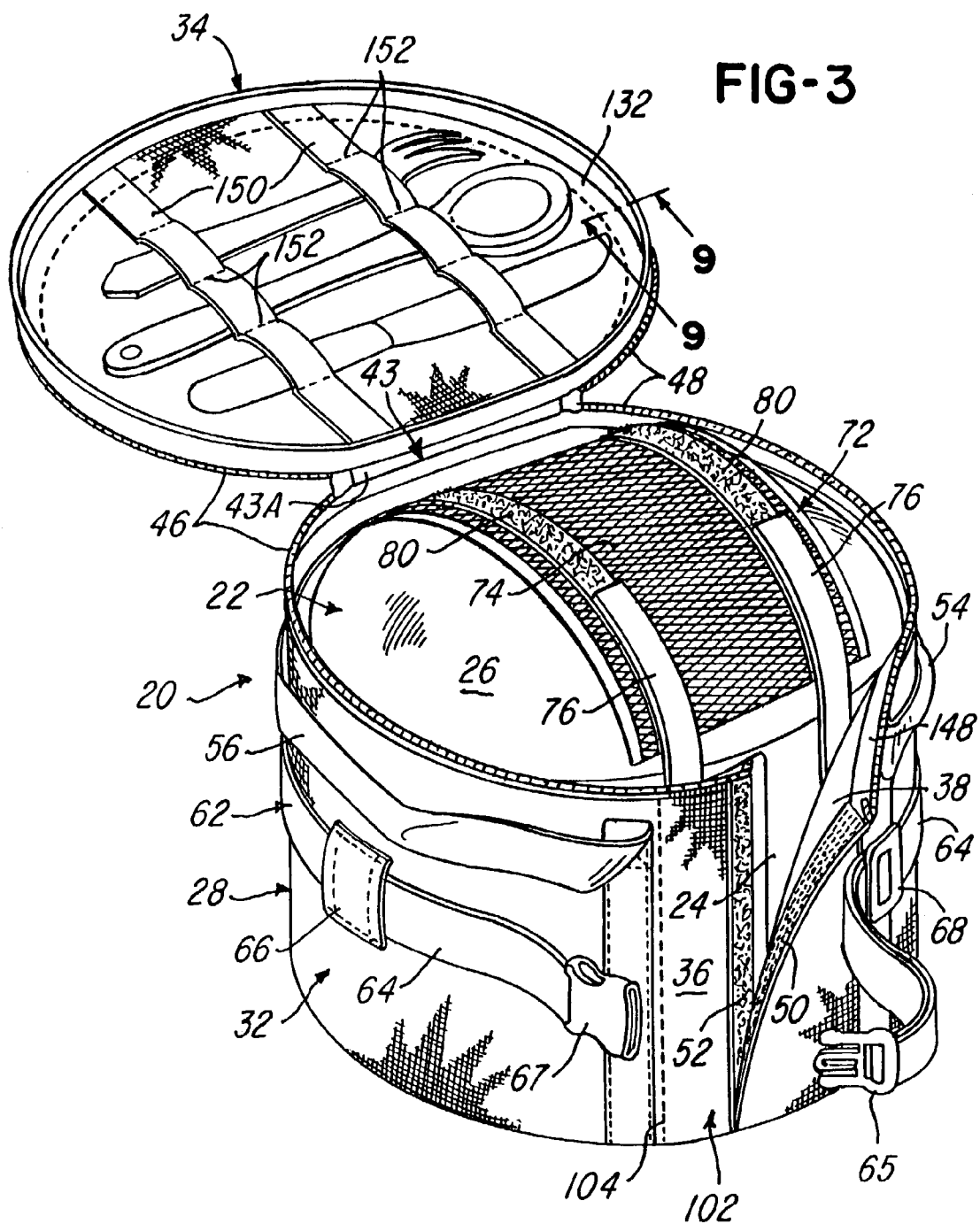
FIG. 3 is another perspective view of the carrying case of FIG. 1 shown partly open and showing parts of a slow cooker housed within the carrying case and also showing utensils held to the underside of the lid of the carrying case.

With reference to FIGS. 2 and 3, inside the box 28 is provided a flexible clamp assembly 72 comprising a relatively wide ribbon-like clamp member 74 which is preferably made from a netting material, such as a nylon net, and a pair of flexible clamp straps 76 which can be made from woven nylon or the like material. Cooperating hook and weave fastener members 78 and 80, respectively affixed to the clamp straps 76 and the clamp member 74, can be used to releasably connect the clamp straps 76 to the clamp member 74. The weave fastener members 80 extend along at least a substantial portion of the length of the clamp member 74 so that clamp assembly 72 can be tightened down on heated food containers having various different heights housed within the box 28.

Referring also to FIG. 7, the side wall 32 comprises a flexible inner sheet 84, a flexible outer sheet 86 and two intermediate insulating layers 88 in the form of liners or sheets 88 and 90 trapped between the inner sheet 84 and the outer sheet 86. Various materials could be used to form the inner and outer sheets 84 and 86. For example, the inner sheet 84 could be made from a woven nylon material and the outer sheet from PVC. Insulating layers 88 and 90 may be made from a closed cell polyethylene sheet or other suitable insulating material and are flexible, but not as flexible as the inner and outer sheets 84 and 86. The insulating sheets 88 and 90 are confined within chambers 92 and 94, respectively, formed between the inner and outer sheets 84 and 88. The chambers 92 and 94 are separated by a vertical, non-insulated, collapsible strip 96 that extends the entire height of the side wall 32 at the rear of the box 28. The collapsible strip 96, which comprises only sections of the inner and outer sheets 84 and 86, is separated from the chambers 92 and 94 by spaced stitchings 98 and 100 (FIGS. 4–7). Another such collapsible strip 102 is provided between the weave strip 52 at the first end portion 36 and a vertical stitching 104. The provision of the collapsible strips 96 and 102 enables the belt 62 to be tightened to cinch down the outer diameter of the side wall 32 to better confine a heated container in the box 28 without significantly altering or distorting the insulated portions of the side wall 32, and thereby enhancing the appearance of the box 28 when cinched.

Referring to FIGS. 2, 4, 5 and 8, bottom wall 30 is made from a flexible upper sheet 110, a lower sheet 112, and a circular insulating layer 114 in the form of a liner or sheet trapped between the upper and lower sheets 110 and 112 in a chamber 116 that is separated from the outer margin of the bottom wall 30 by a circular line of stitching 118, best shown in FIG. 4, whereupon the bottom wall 30 has a marginal, peripherally extending, flexible, collapsible strip or rim 120 which is formed solely by parts of the upper and lower sheets 110 and 112 extending around the chamber 116. The sheets 110 and 112 and the insulating layer 114 are preferably made from the same materials as the corresponding parts of the side wall 32.

As best shown in FIG. 8, the side wall 32 is connected, i.e. sewn, to the bottom wall 30 by stitching 122 which connects the inner and outer sheets 84 and 86 of the side wall 32 to the upper and lower sheets 110 and 112 of the bottom wall 30. The stitched ends of the sheets 84, 86, 110 and 112 are protected by a binding strip 124, which may be made from a nylon trim material, sewn thereover to complete a seam 125 between the bottom wall 30 and the side wall 32. The bottom straps 70 are stitched to the bottom wall 30 and into the seam 125. Similarly, the lower ends of the carrying straps 54 and 56 are stitched to the side wall 32 and into the seam 125. The clamp netting 74 and the clamp straps 76 are also sewn into the seam 125.

With reference to FIG. 9, the box lid 34 is made in a fashion similar to, and from the same materials as, the bottom wall 30. Thus, the box lid 34 comprises a flexible upper sheet 130, a flexible lower sheet 132, and a circular insulating layer 134 in the form of a liner or sheet trapped between the upper and lower sheets 130 and 132 in a chamber 136 that is separated from the outer margin of the lid 30 by a circular line of stitching 138, whereupon the lid 30 has a marginal, flexible, collapsible strip or rim 140 extending peripherally around the chamber 136 which strip or rim 140 is formed solely by the lid's upper and lower sheets 130 and 132.

The upper and lower sheets 130 and 132 of the box lid 34 are joined at a seam 141 by stitching 142. In addition, a fabric strip portion 144 of the upper part of each of the zippers 46 and 48 is connected to the box lid 34 seam 141 by the stitching 142. The stitched ends of the upper and lower lid sheets 130 and 132 and zipper fabric 144 are protected by a nylon or the like binding strip 144 sewn thereover. The side wall's inner and outer sheets 84 and 86 and the lower zipper fabric 146 can be sewn together at the top edge of the side wall 30 in the same manner and covered by a binding strip 148.

As is apparent, the peripherally extending marginal collapsible strip 120 of the bottom wall 30 and the corresponding collapsible strip 140 of the lid 34, serve to enable a cinching of the box 28 onto heated containers of different sizes therein without significant distortion of the circular insulating layers 114 and 134.

With reference to FIG. 3, the utility of the carrying case 20 of this invention may be enhanced by the provisions of a pair of elastic bands 150 to the underside of the lid 34. The bands 150 have separator stitchings 152 to enable the bands 150 to be used for storing serving utensils, such as ladles, knives and forks, underneath the lid 34.

Another useful enhancement is illustrated in FIGS. 3 and 6, which comprises a pouch 154 formed by a piece of sheet material 156 sewn along marginal portions thereof into the lid seam and having a free edge 158 overlying the top of the box lid 34. Edge 158 is gathered by an elastomeric band (not shown) and releasably connected to the top of the box lid 34 by a hook and weave connector assembly. Pouch 154 is useful for carrying other items, such as tablecloths, dishes or utensils useful with a slow cooker.

Figure 10:
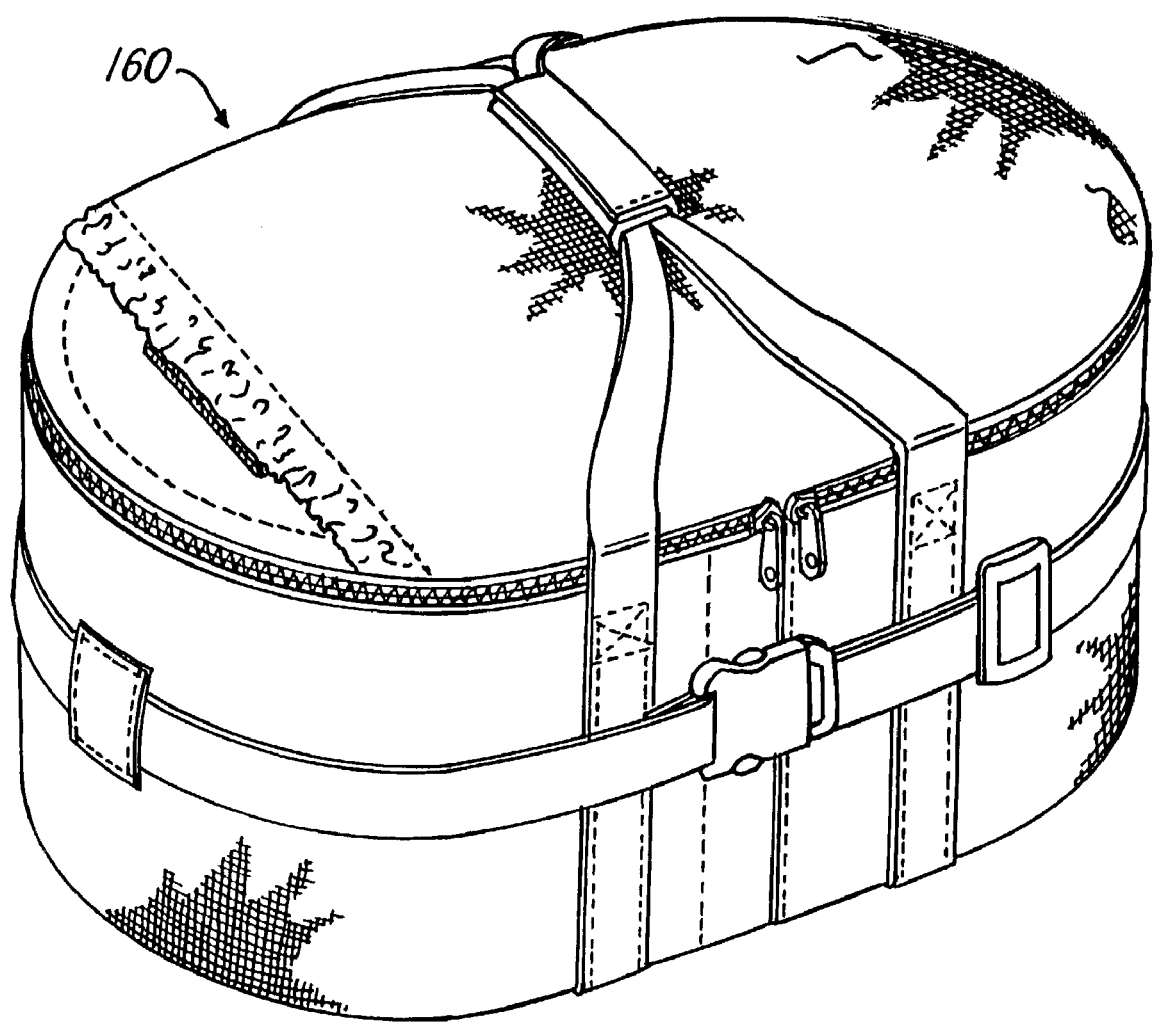
FIG. 10 is perspective view of a second embodiment of a carrying case in accordance with this invention.

Although box 28 is in the general shape of a circular right cylinder, other shapes, particularly oval shapes, are useful for carrying slow cookers or other heated food containers. FIG. 10 illustrates an embodiment of a carrying case, generally designated 160, which is oval in plan and would be useful for slow cookers having an ovate construction. Otherwise, the carrying case 160 is constructed the same as the carrying case 20 of FIGS. 1 through 9.

It will be observed that all parts of the slow cooker box 28 of this invention are sewn together so that the carrying case 20 may be readily manufactured without the use of specialized manufacturing equipment.

Although the presently preferred embodiment of this invention has been described, it will be understood that within the purview of the invention various changes may be made within the scope of the following claims.

Having thus described our invention, we claim:

1. A carrying case for a container, said case comprising:
    a box comprising:
    a flexible, vertical side wall having at least one side-wall chamber for receiving a layer of insulating material, insulating material within said side-wall chamber, and at least one, vertically-extending flexible wall portion separated from said at least one chamber and which does not have an insulating layer;
    a bottom wall;
    a lid; and
    a cinch strap extending around said vertical side wall which can be tightened, the at least one flexible wall portion flexing and collapsing when the cinch strap is tightened so that said box can be collapsed inwardly toward a container within said box.

2. The carrying case of claim 1 wherein said side wall comprises a flexible inner sheet and a flexible outer sheet joined together to form margins of said side-wall chamber and said flexible wall portion being formed by sections of said inner and outer sheets, said inner and outer sheets being joined together between said at least one chamber and said flexible wall portion to separate said at least one chamber from said flexible wall section.

3. The carrying case of claim 2 wherein said inner and outer sheets are joined together between said at least one chamber and said flexible wall portion by stitching.

4. The carrying case of claim 1 further comprising at least one additional side-wall chamber separated from said flexible wall portion and a second layer of insulating material in said at least one additional side-wall chamber, and wherein said flexible wall portion separates said first-mentioned side-wall chamber and said at least one additional side-wall chamber.

5. The carrying case of claim 4 wherein said side wall comprises a flexible outer sheet and a flexible inner sheet joined together to form margins of said side-wall chambers and said flexible wall portion being formed by said two pieces of sheet material between said side-wall chambers.

6. The carrying case of claim 5 wherein said inner and outer sheets are joined together by spaced stitchings to separate said flexible wall portion from said side-wall chambers.

7. The carrying case of claim 1 wherein said lid is flexible and has a lid chamber for receiving a layer of insulating material, a layer of insulating material within said lid chamber, and a flexible rim extending around and separated from said lid chamber.

8. The carrying case of claim 7 wherein said lid chamber has an outer margin and said flexible rim has an inner margin, and wherein said lid comprises a first flexible upper sheet and a first flexible lower sheet, said lid chamber being located between parts of said upper and lower sheets, and said flexible rim being formed by said upper and lower sheets, said first upper sheet and said first lower sheet joined together to form the outer margin of said lid chamber and the inner margin of said flexible rim.

9. The carrying case of claim 8 wherein said first upper and lower sheets are joined by stitching.

10. The carrying case of claim 7 wherein a pouch is formed on the top of said lid.

11. The carrying case of claim 7 wherein elastic bands are stitched to the bottom of said lid for holding utensils or other objects.

12. The carrying case of claim 1 wherein said bottom wall is flexible and has a bottom-wall chamber for receiving a layer of insulating material, a layer of insulating material within said bottom-wall chamber, and a bottom-wall flexible rim extending around and separated from said bottom-wall chamber.

13. The carrying case of claim 12 wherein said bottom-wall chamber has an outer margin and said bottom-wall flexible rim has an inner margin, and wherein said bottom wall comprises a second flexible upper sheet and a second flexible lower sheet, said bottom-wall chamber being located between parts of said second upper and lower sheets, and said bottom-wall flexible rim being formed by said second upper and lower sheets, said second upper sheet and said second lower sheet joined together to form the outer margin of said bottom-wall chamber and the inner margin of said bottom-wall flexible rim.

14. The carrying case of claim 13 wherein said second upper and lower sheets are joined by stitching.

15. The carrying case of claim 1 wherein a clamp assembly is located within said box for clamping a container within said box.

16. The carrying case of claim 15 wherein said clamp assembly comprises a first, flexible clamp member and at least one flexible clamp strap, said clamp member and said at least one flexible clamp strap being releasably connected by a hook and weave connector assembly.

17. A carrying case for a container, said case comprising:
    a box comprising;

a flexible, vertical side wall having at least one chamber for receiving a layer of insulating material, insulating material within said chamber, and at least one, vertically-extending flexible wall portion which does not have an insulating layer;

a bottom wall; and a lid;

a cinch strap extending around said vertical side wall which can be tightened, the at least one flexible wall portion flexing and collapsing when the cinch strap is tightened; and a clamp assembly located within said box for clamping a container within said box, said clamp assembly comprising a first, flexible clamp member and at least one flexible clamp strap, said member and said at least one flexible strap being releasably connected by a hook and weave connector assembly, said first clamp member comprising a ribbon of netting.

18. A carrying case for a heated food container, said case comprising:

a box comprising:

a flexible side wall;

a cinch strap extending around said side wall;

a flexible bottom wall;

a flexible lid; and a clamp assembly located within said box for clamping a container within said box comprising a flexible clamp member comprising a ribbon of netting.

19. The carrying case of claim 18 wherein said side wall has flexible insulating liners separated by vertically-extending flexible portions capable of collapsing when said cinch strap is tightened before said insulated panels begin to collapse.

20. The carrying case of claim 18 wherein said bottom wall and said lid are each insulated by insulating liners surrounded by fabric sections which do not have insulating linings.

21. The carrying case of claim 18 wherein said liners are separated from said fabric sections by stitchings.

* * * * *